Feb. 7, 1956 W. R. VILLMANN 2,734,101

AUTOMATIC TELEPHONE SYSTEM

Filed April 6, 1953

Inventor:
Walter R. Villmann.
By [signature] Atty.

United States Patent Office 2,734,101

Patented Feb. 7, 1956

2,734,101

AUTOMATIC TELEPHONE SYSTEM

Walter R. Villmann, Munich, Germany, assignor to Siemens & Halske Aktiengesellschaft, Munich, Germany, a corporation of Germany Application April 6, 1953, Serial No. 346,829

Claims priority, application Germany April 8, 1952

28 Claims. (Cl. 179—16)

Figures 1, 2:
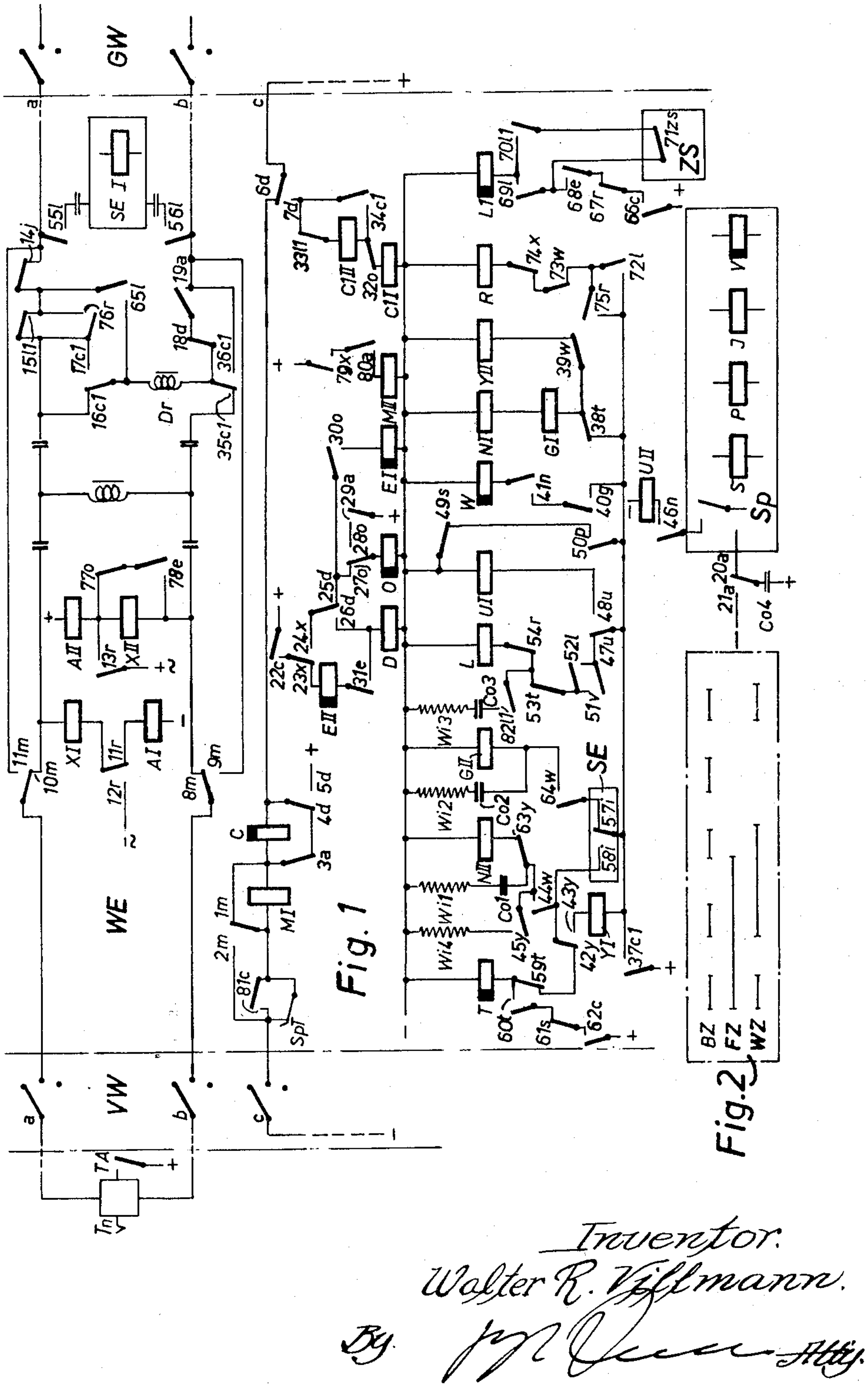

This invention relates to signalling systems and is particularly concerned with an automatic telephone system comprising switching devices and circuit arrangements which evaluate differences in the duration of current impulses and/or in the duration of intervals between impulses for the purpose of controlling corresponding switching operations.

It is necessary in switching devices of this kind in which a single interval between impulses—having a certain length which is equal to or greater than one of the pauses between impulses which is to be evaluated—may under some circumstances suffice as a criterion for the evaluation, to ascertain that the evaluation device does not falsely interpret as a long pause or interval a condition of absence of impulses due to operational troubles, line interruptions and the like, and thereupon falsely initiate switching operations corresponding to such pause. Accordingly, the evaluation or interpretation must start only after ascertaining the presence of current impulses. It is on the other hand also necessary to prevent the start of the evaluation by short surges, switching clicks or the like, that may occur at the instant of connection of the evaluation device or of a preceding impulse receiver, because the absence of the current impulses which have to be evaluated would after such connection be falsely interpreted as a long pause.

These requirements are particularly true in the case of switching devices in which the signals which are subjected to the evaluation are sound frequency signals received by a sound frequency receiver associated with a connection and converted into corresponding current impulses. If no particular precautions were taken in such a case, the switching noises occurring upon switching through of the talking path or other disturbing line noises might suffice for starting the evaluation operation if they are sufficiently pronounced to affect the sound frequency receiver and converted into short current impulses. This is especially true if it is necessary to operate with a very sensitive sound frequency receiver.

The switching device and arrangement according to the invention avoids these errors by the provision of switching means which permit the starting of the evaluation or interpretation only responsive to a current impulse of a predetermined minimum duration. In order to avoid unnecessary circuit complications and expeditures, the invention uses for this purpose the first current impulse which is to be evaluated. It is merely required that this first impulse be longer than the short trouble or random pulses that may occur; it is not necessary that it is also to be evaluated as to its length or duration. It therefore may be part of a long current impulse. The evaluation then takes place based on the length of the succeeding pause.

The switching or circuit arrangement according to the invention is to particular advantage applied in connection with switching apparatus in automatic telephone systems which are placed in a waiting condition under control of a switching operation of the calling party, if the called line is busy, and which thereupon automatically supervise the desired called line by evaluation preferably of different sound frequency operational signals received from the distant end of the connection. The waiting condition is maintained in accordance with the results of the evaluation of a signal of one kind, for example, the busy signal, and is terminated upon receipt of a signal of another kind, for example, responsive to receipt of the idle signal. These connection devices will be briefly referred to as "waiting devices."

The operational sound frequency signals which are transmitted to the calling party may in some circumstances be strongly dampened to about 4 neper. The sound frequency receiver of the waiting device must accordingly exhibit a corresponding great sensitivity so as to process such strongly dampened signals, thereby becoming sensitive to line and switching noises. What has been said before concerning prevention of false operation of the evaluation device due to switching surges and other random signals is therefore fully applicable.

An example of the invention will now be described with reference to the accompanying diagrammatic drawings in which Fig. 1 shows an embodiment of a circuit in conjunction with a waiting device; and Fig. 2 indicates the different operational signals which are to be evaluated.

In Fig. 1, there is a waiting device WE which is placed in a waiting condition by the calling subscriber T*n*, and which repeats the building up of the call automatically until the desired called line is found idle whereupon the waiting subscriber is by revertive call informed that the call has been completed.

The different operational signals shown in Fig. 2 include the busy signal BZ; the idle signal FZ; and the selection signal WZ. The busy signal BZ may for example consist of short current impulses of about 200 ms. and short pauses of about 400 ms. The idle signal FZ corresponds to the known 10 seconds signal in which current is placed on the connection for one second while the pause extends over 9 seconds. The selection signal WZ may exhibit the following rhythm or sequence: A current impulse of 200 ms. is first followed by a pause of 300 ms., then follows a current impulse of 700 ms. and thereafter a pause of 800 ms. These current impulses and pauses are thereupon repeated in the same sequence.

Incident to the selection of a subscriber there will only occur the idle and busy signals which are to be evaluated by the waiting device. However, the calling subscriber may build up a connection only partially or he may in the course of building up a call receive a way-busy signal from a group selection stage, particularly from a toll group selector, which is identical with the party-busy signal BZ. He may then interrupt the further building up of the call and place the waiting device in waiting condition. When the group selection stage becomes idle, the toll group selector will transmit the selection signal WZ. The waiting device must in such a case correspondingly evaluate the busy signal BZ and the selection signal WZ.

The following operations occur in building up a call:

As shown in Fig. 1, the waiting device WE is permanently associated with a first group selector GW. Both are seized in common by the first preselector VW. The impulse dialling by the calling party T*n* is converted in the waiting device because the impulses must be stored therein for repeating the building up of the connection. The dial impulses are received by the line relay A of the waiting device which forms a loop for the line relay of the group selector (not shown) and transmits the incoming impulses by interruption of such loop. The two loops are in the waiting device galvanically separated by a suitable choke-capacitor element.

The test and private conductor *c* is at the instant of seizure by the preselector switched through to the group selector. The seizure of the waiting device is controlled by the line relay A.

The operation of the preselector VW is started in known manner when the subscriber T*n* removes the receiver and an idle first selector GW is seized over a circuit extending from battery in the preselector VW, wiper *c*, locking key S*p*T, contacts 1*m*, 3*a*, 4*d*, 6*d*, conductor *c* to ground in the group selector GW. The line relay A energizes over the line loop from ground, windings AII, XII, contact 8*m*, *b*-conductor, subscriber's line T*n*, *a*-conductor, contact 10*m*, winding XI, contact 11*r*, winding AI to battery. The differential relay X does not energize in this circuit. Relay A closes its contact 19*a* to complete the loop for the group selector extending over the *a*-conductor, 14*j*, 1511, 16c1, D*r*, 18*d*, 19*a*, to the *b*-conductor. Relay A also opens its contact 3*a*, thereby removing the shunt around the busy relay C which is disposed in the *c*-conductor and such relay energizes and by closing its contact 22*c* prepares for the initiation of the waiting condition.

The dial impulses transmitted by the subscriber T*n* interrupt the line loop in step with such impulses causing corresponding deenergization of the line relay A. The latter correspondingly interrupts the loop to the group selector GW at its contact 19*a* thus transmitting the dial impulses thereto. The incoming dial impulses are at the same time conducted to a suitable impulse storage device S*p*, by means of contact 20*a*, in the form of discharge pulses of the capacitor C*o*4 which has been charged over contact 21*a*, and are suitably stored therein for repeating the building up of the connection.

If the line desired by the party T*n* is idle, there will be no further switching operations in the waiting device until the call is released when the relays A and C are deenergized again.

However, if the desired line is busy, the calling party T*n* may initiate the waiting condition. He operates for this purpose the grounding key TA provided at his station thereby causing in the waiting device energization of the differential relay X over its winding I in a circuit extending from ground, key TA, line conductor *a*, 10*m*, XI, 11*r*, AI to battery. Relay X closes its contact 24*x* to energize relay O from ground, 22*c*, 24*x*, 25*d*, 27*o*, winding of O to battery. Relay O closes its contact 28*o* to complete a holding circuit for itself to ground at closed contact 29*a* of relay A. The relay O supervises the restoring of the receiver by the party T*n* after such party has depressed the key TA; upon its deenergization it causes starting of the re-seizure and repeated selection by the waiting device based on the dial pulses which had been stored in the storage device S*p*.

Relay E energizes over its winding I responsive to operation of relay O in a circuit from ground, 22*c*, 24*x*, 25*d*, 30*o*, winding EI to battery. Relay E is held energized over its winding EII after release of the subscriber's key TA and consequent deenergization of relay X from ground, 22*c*, 23*x*, EII, 31*e*, winding of relay D to battery. Relay D energizes in this circuit and forms by closing its contact 26*d* a holding circuit for itself independent of the relay X. By closing its contact 5*d*, relay D completes a holding circuit for the test relay (not shown) of the pre-selector VW and for the relay C of the waiting device. Contact 6*d* is opened to cause deenergization of the test relay (not shown) of the group selector GW. The group selector and the succeeding switching devices are released in known manner. The re-seizure is prepared by the closure of contact 7*d*.

The relays A and O deenergize successively when the subscriber T*n* replaces the receiver. Accordingly, contact 32*o* will be closed to complete the seizure circuit for the group selector GW in which the relay C1 is energized over its winding I and II from battery; C1I, 32*o*, C1II, 3311, 7*d*, conductor *c* to ground in the group selector GW. Contact 34c1 is closed upon energization of relay C1 to busy the group selector against seizure from other switches by shortcircuiting the high resistance winding II of the relay C1. The loop for the group selector is closed over the contacts 17c1 and 36c1.

The evaluation device comprising the relays G and N as well as further switching means of the waiting device are respectively prepared and directly switched in by the closure of contact 37c1 shown at the bottom left of Fig. 1. Relays Y, N and G are energized from ground, 37c1, 38*t*, 39*w*, GI energizing in series with NI, and YII energizing over contact 39*w* in parallel with NI and GI, to battery. Relay W which especially marks the waiting condition for the evaluation device energizes after G and N in a circuit from ground, 37c1, 40*g*, 41*n*, winding of W to battery. By opening its contact 39*w*, the relay W disconnects the winding II of the relay Y (YII) but this relay continues to hold over its winding I (YI) in a circuit from ground, 37c1, YI, 43*y*, 44*w*, 45*y* and resistor W*i*4 to battery.

The relay U is temporarily switched in over its winding II (UII), after relay N has closed its contact 46*n*, as a signal that the storage device S*p* is ready to transmit. Relay U continues to hold over its winding I (UI) in a circuit from ground, 37c1, 48*u*, UI to battery. The storage device now transmits the dial impulse series by corresponding interruption of the group selector loop by the contact 14*j* of its impulse relay J. Upon completing transmission of the last impulse series, the control relay S of the storage device will deenergize and close its contact 49*s*. The supervising relay P closes at the same time its contact 50*p*. Contacts 49*s* and 50*p* shortcircuit the winding I of relay U (UI) causing the relay U to release with some delay, such relay opening upon release its contact 48*u* and closing its contact 47*u*. Another control relay V in the storage device which controlled the maintaining of the pauses between the individual impulse series deenergizes in the meantime with some delay. After deenergization of U and during the period of deenergization of the relay V the relay L of the evaluation device energizes from ground, 37c1, 47*u*, 51*v*, 53*t*, 54*r*, winding of L to battery. Upon energizing, relay L completes a holding circuit for itself over its contact 521

Relay L upon energizing closes its contacts 551 and 561 (top right of Fig. 1) thereby connecting the signal receiver SE to the line conductors of the connection. The signal receiver SE comprises a relay I which energizes in step with the sound frequency signal thus closing its contact 58*i* for the duration of the sound signal while closing its contact 57*i* during the pauses between the signal. The winding I of relay Y (left bottom of Fig. 1) is shortcircuited responsive to the first signal, over contact 58*i*, and releases with some delay. The delay is such that brief closure intervals of the contact 58*i*, which may be caused by switching or trouble noises on the line cannot result in deenergization of relay Y. The relay Y deenergizes only responsive to receipt of a signal of a duration corresponding at least to the shortest operational signal that is to be evaluated. In the assumed case, the duration of such signal is approximately 200 ms. of the busy signal BZ and relay Y accordingly deenergizes.

Relay T energizes responsive to deenergization of relay Y in a circuit including the closed contact 58*i* which extends from ground, 37c1, 58*i*, 42*y*, 59*t*, winding of T to battery. Relay T remains operated in a local holding circuit depending on the control relay S of the storage device and the seizure relay C of the waiting device, such holding circuit extending from ground, 62*c*, 61*s*, 60*t*, winding of T to battery. The evaluation relays G and N were up to this moment blocked by the relay T, such blocking being caused by the prolonged energization of the windings I (NI and GI in series) of these two relays in the circuit including the contact 38*t*.

This circuit is now interrupted by the opening of contact 38*t*. The operating condition of the evaluation relays now depends on the duration of the tone and on the pauses between the tone signals, respectively. The windings II of the relays G and N (GII and NII) are now alternately energized by the alternate closure of contacts 57*i* and 58*i*, winding GII responding in a circuit from ground, 37*c*1, 57*i*, 64*w*, and winding NII responding in a circuit over contacts 58*i*, 44*w* and 63*y*. These windings operate with release delay due to being in series with capacitors *Co*1 and *Co*2, respectively, and having resistors *Wi*1 and *Wi*2 respectively in parallel therewith. Relay G evaluates the duration of the tone signal and relay N the duration of the pause. The release delays of the relays correspond respectively to the duration of the tone and the pause of the busy signal BZ. Accordingly, the release delay of the relay G bridges the tone of 200 ms. duration and the release delay of relay N bridges the pause of 400 ms. of the busy signal so that both relays remain energized responsive to the busy tone.

However, responsive to receipt of the idle signal FZ, either the relay G or the relay N will become deenergized; G by the tone of 1 sec. duration and correspondingly long opening of contact 57*i*, and N by the pause of 9 sec. and correspondingly long opening of the contact 58*i*.

It shall now be assumed that the desired line is again found busy responsive to renewed building up of the connection. The evaluation relays G and N therefore remain energized during the receipt of the busy signal BZ. Relay L has closed its contact 691 thus forming a circuit for relay L1 (bottom right in Fig. 1) which extends from ground, 66*c*, 67*r*, 68*e*, 691, winding of L1 to battery. Relay L1 energizes and closes a holding circuit for itself independent of the relay L over its own contact 7011 and contact 71*zs* of a suitable timing switch ZS which extends from ground, 66*c*, 67*r*, 68*e*, 71*zs*, 7011, winding of L1 to battery. At contact 1511, relay L1 opens the loop to the group selector GW, thereby preparing for the release thereof. The loop is however still maintained over the closed contact 651 of the relay L. By closing its contact 8211, relay L1 connects the capacitor *Co*3 which is in series with resistor *Wi*3, in parallel with the winding of relay L, thus imparting to L, which had been interrupted by the opening of contact 53*t* responsive to energization of relay T, a considerable release delay. This release delay limits the observation interval, that is, the interval during which the signal receiver SE is connected to the line and during which the received operational signals are evaluated. As will be realized, the time limitation depends on the operating condition of the relay T because relay L can deenergize with some delay only after opening of contact 53*t* thereof.

Upon deenergizing, relay L opens the loop to the group selector GW at its contact 651 thus causing release thereof. The private conductor *c* of the group selector is thereby opened and the relay C1 in the waiting device WE deenergizes thereby opening its contact 37*c*1 and thus causing deenergization of all relays depending on such contact. The relay L1 is deenergized after the lapse of a certain interval which is determined by the timing switch ZS, responsive to the opening of contact *zs*, and by closing its contact 3311 initiates the re-seizure of the group selector GW. The switching operations up to the connection of the signal receiver SE to the line conductors, by the contacts 551 and 561 of the relay L, correspond to those already described above.

It shall now be assumed that the desired line is idle. The signal receiver SE therefore receives the idle signal FZ. After the relay Y is as before described deenergized responsive to the receipt of the first signal and after the relay T has energized and freed the evaluation relays G and N, either one of these relays will become deenergized incident to the evaluation of the idle signal, relay G during the tone of 1 sec. duration and relay N during the pause of 9 sec. duration, respectively. If the first received tone should be too short due to mutilation by switching operations in the transmission path, the relay N will deenergize with certainty during the succeeding pause of 9 sec. duration.

In case the selection signal WZ is received instead of the idle signal, the relays G and N will respectively deenergize either during the tone of 700 ms. duration or during the pause of 800 ms. duration.

The deenergization of at least one of the evaluation relays interrupts the circuit of relay W due to opening of either one of the corresponding contacts 40*g* or 41*n*. Relay W deenergizes thereby marking the termination of the waiting condition and initiating the further switching operations including the revertive call to the waiting subscriber T*n*. The ringing relay R actuates responsive to closure of the contact 73*w* in a circuit from ground, 37*c*1, 721, 73*w*, 74*x*, winding of R to battery. Relay R closes a holding circuit for itself at its contact 75*r* which shunts the contact 721. Contact 54*r* opens causing deenergization of relay L without delay. The latter relay (L) opens its contact 651 but the loop to the group selector GW is held over closed contact 76*r* until the contact 1511 closes again responsive to deenergization of the relay L1 due to interruption of its holding circuit by the opening of contact 67*r* when contact 1511 takes over the maintenance of the loop circuit. Contacts 12*r* and 13*r* connect ringing current to the line of the waiting subscriber T*n* in a circuit from the ringing current source, 12*r*, XI, 10*m*, line conductor *a*, station T*n*, line conductor *b*, 8*m*, 78*e*, 770, 13*r* back to the grounded terminal of the ringing current source.

The differential relay X, having its winding II short-circuited by the contacts 77*o* and 78*e*, energizes over its winding I when the subscriber T*n* removes the receiver thereby opening its contact 74*x* to release relay R which disconnects the ringing current. Relay A energizes now over closed contact 11*r* and the subscriber's loop. Relay E deenergized due to the opening of contact 23*x* responsive to actuation of relay X. Relay E opens its contact 78*e* thereby removing the shunt from the winding II of relay X and causing such relay to deenergize. Relay D which was held actuated over contacts 24*x* and 26*d*, during the energization of relay X, is now released and at its contact 6*d* switches through the private conductor *c* from the preselector VW to the group selector GW. The ground potential which served for holding the test relay (not shown) of the preselector and also the seizure relay C of the waiting device is disconnected at contact 5*d*.

The relay M is temporarily energized over its winding II after actuation of the relay A and during the period of release of the relay R, in a circuit from ground, 79*x*, 80*a*, winding of MII to battery. At contact 1*m*, the relay M removes the shunt across its winding I (MI) and continues to hold over this winding which is disposed in the private conductor *c*. Contacts 8*m* and 10*m* of relay M, disposed in the line conductors, are opened and contacts 9*m* and 11*m* are closed. The line conductors are over these latter contacts switched through from the subscriber T*n* directly to the group selector GW. The line relay of the group selector (not shown) now supervises the line for the subscriber T*n* in known manner.

The line relay A deenergizes responsive to the opening of contacts 8*m* and 10*m*. The relay C1 and therewith all relays of the waiting device WE which depended on its contact 37*c*1 released before responsive to the opening of contact 7*d*. Relay C deenergizes due to shortcircuiting its winding by the contacts 3*a* and 4*d* responsive to release of the relays A and D.

Only the relay M is now energized over its winding I (MI) in the private conductor *c*. This relay will release and restore its contacts when the subscriber T*n* restores the receiver thereby causing release of the connection by interruption of the private conductor *c* in the group selector.

Changes may be made within the scope and spirit of the appended claims.

I claim:

1. In an automatic telephone system having switches for building up connections, a device for governing the operation of said switches, means in said device for receiving signal impulses, a circuit arrangement for evaluating said impulses to determine the duration of said impulses and the duration of pauses therebetween, and control switching means for starting of the operation of said circuit arrangement to control the operation of said device only responsive to the determination of an impulse of a duration which is at least equal to the duration of the shortest impulse to be evaluated.

2. The structure and co-operation of elements as set forth in claim 1, comprising means for normally blocking the operation of said circuit arrangement, and means governed by said control switching means for cancelling said blocking of the operation of said circuit arrangement.

3. The structure and co-operation of elements as set forth in claim 2, comprising a first relay for controlling said blocking and the cancelling of such blocking, and a second slow acting relay forming part of said control switching means for governing the actuation of said first relay, the operation of said second relay being governed by an impulse having a duration which is equal to the duration of the shortest impulse to be evaluated.

4. In an automatic telephone system having switches controlled by calling subscribers for building up connections to desired called lines, a device associated with a predetermined one of said switches and controlled by a calling subscriber for placing such switch in waiting condition when a desired line to be reached thereover in the building up of a connection is found busy thereby and for thereafter automatically supervising the operating condition of such desired line by evaluation of operational signals received therefrom which indicate the respective busy or idle condition thereof, whereby said waiting condition is respectively maintained responsive to busy signal received from the desired called line and terminated responsive to an idle signal received therefrom, said device comprising means for receiving said signals, means for evaluating said signals, means for normally blocking the operation of said evaluating means, and switching means responsive to signals from said signal receiving means for freeing said normally blocked evaluating means for evaluation operation only responsive to a signal of a duration which corresponds at least to the duration of the shortest signal to be evaluated.

5. The structure and co-operation of elements as set forth in claim 4, wherein said operational signals are sound frequency signals indicating different operational conditions of the desired called line.

6. The structure and co-operation of elements as set forth in claim 4, comprising means for inhibiting the operation of said switching means responsive to signals of short duration caused by switching operations and also in the absence of signals due to any cause.

7. The structure and co-operation of elements as set forth in claim 4, comprising a control relay responsive to the first received signal of a predetermined minimum duration for controlling said evaluation means.

8. The structure and co-operation of elements as set forth in claim 4, comprising a control relay responsive to the first received signal of a predetermined minimum duration for controlling said evaluation means, and means controlled by such relay for maintaining operation thereof in a holding circuit prepared thereby.

9. The structure and co-operation of elements as set forth in claim 4, comprising a control relay responsive to the first received signal of a predetermined minimum duration for controlling said evaluation means, said relay being slow-to-operate.

10. The structure and co-operation of elements as set forth in claim 7, comprising a further slow-to-release relay forming part of said switching means for causing slow-to-operate actuation of said control relay.

11. The structure and co-operation of elements as set forth in claim 7, comprising a further slow-to-release relay forming part of said switching means for causing slow-to-operate actuation of said control relay, and contact means actuated by said signal receiving means for causing deenergization of said further relay by short-circuiting a winding thereof.

12. The structure and co-operation of elements as set forth in claim 7, comprising means forming a local holding circuit for said evaluation means, and contact means operated by said control relay upon energization thereof for interrupting said holding circuit to free said evaluation means for evaluation operation thereof.

13. The structure and co-operation of elements as set forth in claim 4, comprising a pair of relays forming said evaluating means, one of said relays for supervising the duration of signal impulses and the other one for supervising the duration of pauses between signal impulses, means for making said relay slow-to-release, local circuit means for maintaining said relays normally energized, means for interrupting said local circuit means, contact means controlled by said signal means for thereafter controlling the operation of said relays to maintain said relays energized responsive to receipt of a signal signifying a certain operative condition of the desired called line and to cause release of at least one of said relays responsive to receipt of a signal which signifies another operative condition of such line.

14. The structure and co-operation of elements as set forth in claim 13, comprising a control relay for governing the waiting condition of said switch, and circuit means controlled by said pair of relays for governing said control relay.

15. The structure and co-operation of elements as set forth in claim 13, comprising a control relay for governing the waiting condition of said switch, and circuit means governed by said control relay for controlling the operation of said pair of relays.

16. The structure and co-operation of elements as set forth in claim 13, comprising a control relay for marking the waiting condition of said switch, and circuit means governed by the deenergization of one of said pair of relays for releasing said control relay to terminate such waiting condition.

17. The structure and co-operation of elements as set forth in claim 16, comprising means controlled by said control relay for initiating transmission of revertive call ringing current to the waiting calling subscriber's line.

18. The structure and co-operation of elements as set forth in claim 4, comprising a control relay for terminating the blocking of said evaluating means, and circuit means governed by said control relay for limiting the duration of the operation of said evaluating means.

19. The structure and co-operation of elements as set forth in claim 18, comprising a supervising relay for governing said signal receiving means, and circuit means governed by said control relay upon operation thereof for releasing said supervising relay.

20. The structure and co-operation of elements as set forth in claim 18, comprising a supervising relay for governing said signal receiving means, and circuit means governed by said control relay upon operation thereof for releasing said supervising relay to release said signal receiving means.

21. The structure and co-operation of elements as set forth in claim 18, comprising a supervising relay for governing said signal receiving means, and circuit means governed by said control relay upon operation thereof for releasing said supervising relay to release said signal receiving means, said supervising relay being slow-to-release.

22. The structure and co-operation of elements as set forth in claim 7, comprising a supervising slow-to-release relay forming part of said switching means for causing slow-to-operate actuation of said control relay, a marker relay for designating the waiting condition of said switch, a relay for controlling the operative release of said evaluating means, said last named relay being controlled by said supervising relay over contacts of said control relay and said marker relay.

23. In an automatic telephone system having subscriber's stations and trunk lines and having switches controlled by dial impulses transmitted from a calling subscriber's station for extending a connection from such calling station to another desired subscriber's station or to a desired trunk line, respectively, apparatus associated with a predetermined one of said switches for placing a connection desired by a calling subscriber in waiting condition when such connection cannot be completed by the calling subscriber due to busy condition of the desired subscriber's station or trunk line, respectively, impulse storage means in said apparatus for receiving and storing dial impulses transmitted by the calling subscriber in building up the desired connection, means controlled by the calling subscriber for initiating the operation of said apparatus to place the corresponding desired connection in waiting condition, said calling subscriber thereupon replacing the receiver, means in said apparatus for holding the connection from the waiting calling subscriber to said predetermined switch, means controlled by said apparatus for releasing the connection extending from said predetermined switch, means thereafter controlled by said apparatus for automatically building up the connection from said predetermined switch to the respective desired called station or trunk, a signal receiving device associated with said apparatus for receiving from the desired called station or trunk signals which indicate the busy or idle condition thereof, signal evaluating means in said apparatus for interpreting said signals, means controlled by said evaluating means responsive to a signal which signifies that the desired called station or trunk is busy for again releasing the connection extending from said predetermined switch, means for thereafter automatically repeatedly building up the desired connection until the corresponding called station or trunk is found idle, and means controlled by said evaluating means responsive to a signal which signifies that the desired station or trunk is idle for holding the connection to such station or trunk and for causing transmission of revertive ringing to the waiting calling subscriber to inform such subscriber of the completion of the desired connection.

24. The structure and co-operation of elements as set forth in claim 23, comprising a timing device for determining the intervals between repeated attempts of said apparatus to build up the desired connection.

25. The structure and co-operation of elements as set forth in claim 23, comprising a pair of relays for respectively evaluating the duration of signals and the pauses between signals received by said signal receiving device.

26. The structure and co-operation of elements as set forth in claim 23, comprising a pair of relays for respectively evaluating the duration of signals and the pauses between signals received by said signal receiving device, and relay means coacting with said relays for determining the operative actuation thereof.

27. The structure and co-operation of elements as set forth in claim 23, comprising a pair of relays for respectively evaluating the duration of signals and the pauses between signals received by said signal receiving device, and discriminating means for determining the operative actuation of said relays in accordance with the duration of said signals and said pauses, respectively.

28. The structure and co-operation of elements as set forth in claim 23, comprising a pair of relays for respectively evaluating the duration of signals and the pauses between signals received by said signal receiving device, and discriminating means for determining the operative actuation of said relays in accordance with the duration of said signals and said pauses, respectively, to prevent false operation thereof responsive to random sound frequencies and responsive to absence of signals, respectively.

References Cited in the file of this patent

UNITED STATES PATENTS

| | | |
|---|---|---|
| Re. 22,462 | Moody et al. | Mar. 28, 1944 |
| 1,857,833 | Baker et al. | May 10, 1932 |
| 2,534,500 | Claesson et al. | Dec. 19, 1950 |
| 2,580,069 | Blount | Dec. 25, 1951 |